United States Patent [19]

Saito et al.

[11] Patent Number: 4,828,213
[45] Date of Patent: May 9, 1989

[54] HEIGHT ADJUSTING DEVICE FOR AUTOMOTIVE SEAT

[75] Inventors: Seishiro Saito; Shigeru Kanai, both of Akishima, Japan

[73] Assignee: Tachi-S Co., Ltd., Tokyo, Japan

[21] Appl. No.: 165,496

[22] Filed: Mar. 8, 1988

[51] Int. Cl.$^4$ .............................................. B60N 1/02
[52] U.S. Cl. .................... 248/421; 248/422; 297/338; 297/345; 74/535
[58] Field of Search ............... 248/651, 652, 669, 157, 248/419, 420, 421, 422, 423; 192/20; 74/529, 535; 297/344, 345, 346, 338, 339

[56] References Cited

U.S. PATENT DOCUMENTS

| | | | |
|---|---|---|---|
| 3,695,570 | 10/1972 | Ishida | 248/397 |
| 4,067,533 | 1/1978 | Kazoaka | 297/328 |
| 4,422,611 | 12/1983 | Kitsuda | 248/421 |
| 4,529,159 | 7/1985 | Terada | 248/421 |
| 4,533,027 | 8/1985 | Otani | 297/328 |
| 4,616,876 | 10/1986 | Suzuki | 297/328 |
| 4,643,383 | 2/1987 | Fukuta | 248/421 |
| 4,648,575 | 3/1987 | Kawade | 248/421 |
| 4,687,251 | 8/1987 | Kazoaka | 297/346 |
| 4,767,157 | 8/1988 | Kazoaka | 297/345 |
| 4,778,138 | 10/1988 | Yamada | 248/421 |

FOREIGN PATENT DOCUMENTS 2659308 7/1978 Fed. Rep. of Germany ...... 248/421
60-206739 10/1985 Japan .

Primary Examiner—J. Franklin Foss
Assistant Examiner—Robert A. Olson
Attorney, Agent, or Firm—Browdy & Neimark

[57] ABSTRACT

A height adjusting device for an automotive seat which is actuated by rotation of a drive rod through a gear and link mechanism. The seating height adjustment is locked and unlocked by means of a stopper and lock gear mechanism. A lock releasing means is provided in the stopper and lock gear mechanism such that raising and lowering of an operation lever causes the disengagement of the stopper from the lock gear though the lock releasing means to permit a desired higher or lower seating height adjustment, without any other special operations. The lock releasing means comprises a wire member and release plate.

5 Claims, 9 Drawing Sheets

F I G. 14
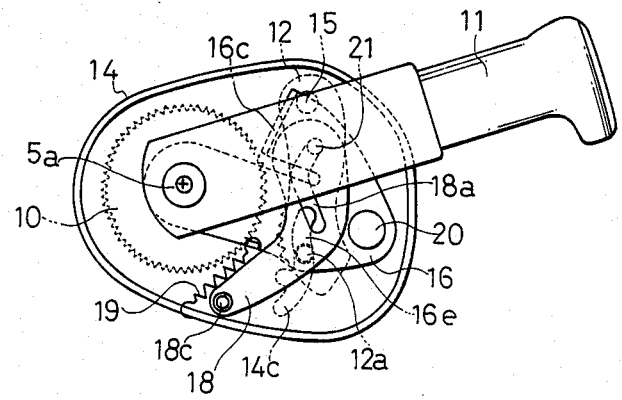
F I G. 15
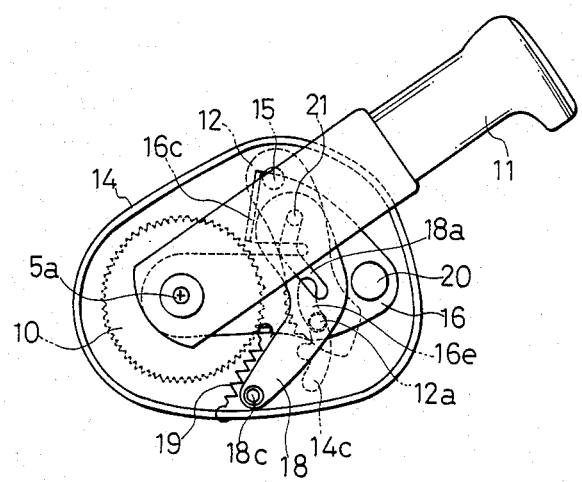

HEIGHT ADJUSTING DEVICE FOR AUTOMOTIVE SEAT

BACKGROUND OF THE INVENTION

1. Field of the Invention

The present invention relates to a height adjusting device used with an automotive seat, which is adapted for adjusting the seating height of the seat, and in particular to a locking device for such height adjusting device.

2. Description of the Prior Art

Among the known locking mechanisms for seat height adjusting device, there are disclosed the ones, for example, from the Japanese Laid-Open Publication No. 60-206739 and U.S. Pat. No. 4,616,876. According to the former Japanese prior art, a stopper and lock gear arrangment is described as being operable by a lever such that the stopper is engaged with or disengaged from the lock gear by virtue of the lever being rotated, and the lever is normally biased to a predetermined position by a spring means in a sense causing the lever to return to that position after the rotation thereof for seat height adjustment. As regards the latter U.S. prior art, the locking and unlocking of seat height adjusting device is effected by a manually extending and retracting operations of a telescope lever, according to which a lock gear is disengaged from a fixed gear by drawing out the lever through the associated movement of a wire assembly, and after vertical rotation of the lever for the height adjustment, the drawing back of the lever causes the engagement of the lock gear with the fixed gear for locking the seat height adjusting device.

However, the above-mentioned prior arts are found to have their inherent drawbacks in that, in the Japanese one, there is a great possibility of the stopper being released from its engagement with the lock gear when a load is applied to the spring means during the rolling or jolting of an automobile and in the U.S. one, before adjusting the seat height, an occupant on the seat has to draw out the lever for disengaging the lock gear from the fixed gear and rotate the lever, thus resulting in a troublesome operation and waste of time.

SUMMARY OF THE INVENTION

With the above-stated drawbacks in view, it is therefore a primary purpose of the present invention to provide an improved height adjusting device which is easy to effect the locking and unlocking of the seat height adjusting mechanism and retain the locked state thereof in a positive manner.

To achieve this purpose, the present invention comprises an operation lever rotatably secured to a drive rod of a seat height adjusting device, a lock gear fixed on a seat frame, a stopper in meshed engagement with the lock gear, a movable member provided externally of the lock gear, on which movable member the stopper is rotatably journaled at its one end portion, the movable member being firmly fixed on the drive rod and having a lock releasing hole perforated therein for releasing the engagement of the stopper with the lock gear, a plate member having an engagement flange portion to be operatively engaged with the operation lever, a biasing means extended between the lower portion of the plate member and the movable member in order that the plate member is normally biased in a direction wherein the stopper is in meshed engagement with the lock gear, and a wire member arranged between the the plate member and operation lever such that the plate member can be raised by the operation lever.

Accordingly, in a normal state, the operation lever is retained against movement by virtue of the wire member and the stopper is kept in engagement with the lock gear by means of the biasing means which biases the plate member in a direction to cause the engagement of those stopper and lock gear. Then, the raising of the operation lever causes the rotation of the plate member via the engagement flange portion of the plate member so as to cause the rotation of the stopper along the lock releasing hole of the plate member with the result that the stopper is disengaged from the lock gear, and reversely the lowering of the operation lever causes the rotation of the plate member via the wire member so as to effect the rotation of the stopper along the lock releasing hole to thereby bring the stopper to disengagement from the lock gear. The further raising or lowering of the operation lever produces the rotation of the drive rod to effect a corresponding higher or lower seating height adjustment of the seat.

It is a secondary purpose of the present invention to provide a positive locking mechanism in the height adjusting device.

To this end, a release plate member is provided in the above-described structure instead of the wire member, such that it is rotatably mounted in a manner engageable with the engagement flange portion of the plate member. In this release plate member, perforated is a guide hole, and the operation lever has a guide pin provided thereon which is slidably inserted through such guide hole of the release plate member.

Accordingly, with this particular structure, in a normal state, the stopper is retained in engagement with the lock gear by the reason of its being supported at a locking position within the lock releasing hole of the plate member, and the plate member is provisionally supported motionless by the guide hole. When raising the operation lever, the release plate member is rotated along the guide hole to engage with the engagement flange portion of the plate member, whereby the plate member is rotated, causing the stopper to rotate along the lock releasing hole and disengage from the lock gear. Reversely, the lowering of the lever, also, produces the likewise disengagement operation of the stopper by virtue of the rotation of the release plate member. The further raising or lowering of the operation lever produces the rotation of the drive rod to effect a corresponding higher or lower seating height adjustment of the seat.

BRIEF DESCRIPTION OF THE DRAWINGS

FIG. 14 is a side view which shows that the lever is further raised;

FIG. 15 is a side view showing that the raising of the lever causes the rotation of the drive rod to actuate the device for a higher seating position;

DETAILED DESCRIPTION OF PREFERRED EMBODIMENTS OF THE INVENTION

Figure 1:
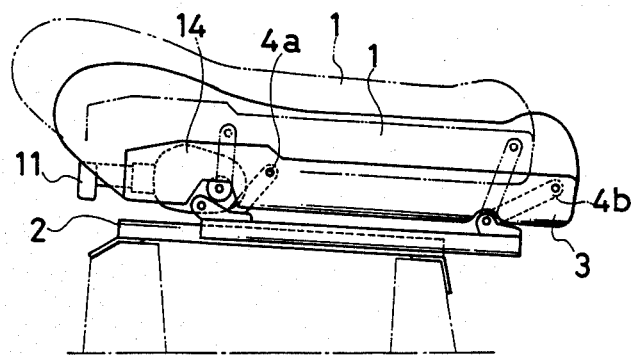
FIG. 1 is a side view of an automotive seat provided with a height adjusting device in accordance with the present invention.
Figure 2:
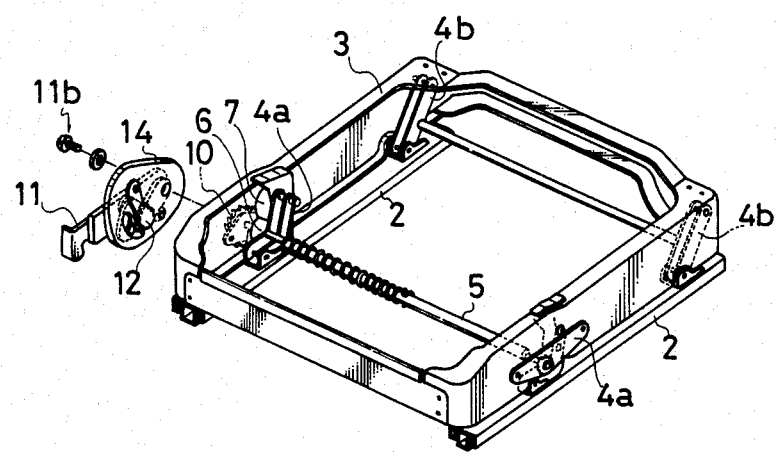
FIG. 2 is a perspective view of whole parts of a first embodiment of the present invention.

At first, with reference to FIGS. 1 and 2, illustrated are respectively a seat cushion (1) of an automotive seat, which is provided with a height adjusting device of the present invention to be described hereinafter, and a seat frame (3) upon which the seat cushion (1) is mounted.

As shown, the seat cushion (1) and seat frame (3) are mounted on a seat slide device (2), with four movable links (4a)(4a)(4b)(4b) arranged between the former (1)(3) and the latter (2). A drive rod (5) is journaled rotatably by the two parallel-spaced lateral frame sections of the seat frame (3). To the end portion of the drive rod (5), integrally fixed is a pinion gear (6) which is meshed with a sector gear (7) rotatably provided on the seat frame (3) and operatively connected with one of the links (4a). With this structure, the rotation of the drive rod (5) causes the rotation of the pinion gear (6) to effect the vertical rotation of the sector gear (7) and in response to such rotation of the sector gear (7), the four links (4a)(4a)(4b)(4b) are moved upwards and downwards so as to raise and lower the seat frame (3) for a desired seating height adjustment of the seat cushion (1). Numeral (8) denotes a coil spring member wound around the drive rod (5) and adapted to bias the seat frame (3) in an upward direction.

Laterally of the seat frame (3), there is fixedly mounted a lock gear (10), as indicated in the phantom line, which has a central hole (10a) (See FIG. 3) perforated therein, through which is inserted one end portion of the drive rod (5) in a rotatable manner. A housing (14) is fixedly provided on the extremity of such one end portion of the drive rod (5), the housing (14) being, therefore, formed as a movable member in accordance with the present invention, whose function will be described later. A stopper (12) is rotatably mounted on the housing (14) such as to be in a meshed engagement with the lock gear (10). Further, externally of the housing (14), an operation lever (11) is rotatably mounted.

Now, reference is made to FIGS. 3 through 6, in which the first embodiment of the present invention is illustrated, and a specific description will be given thereon as below.

Figure 3:
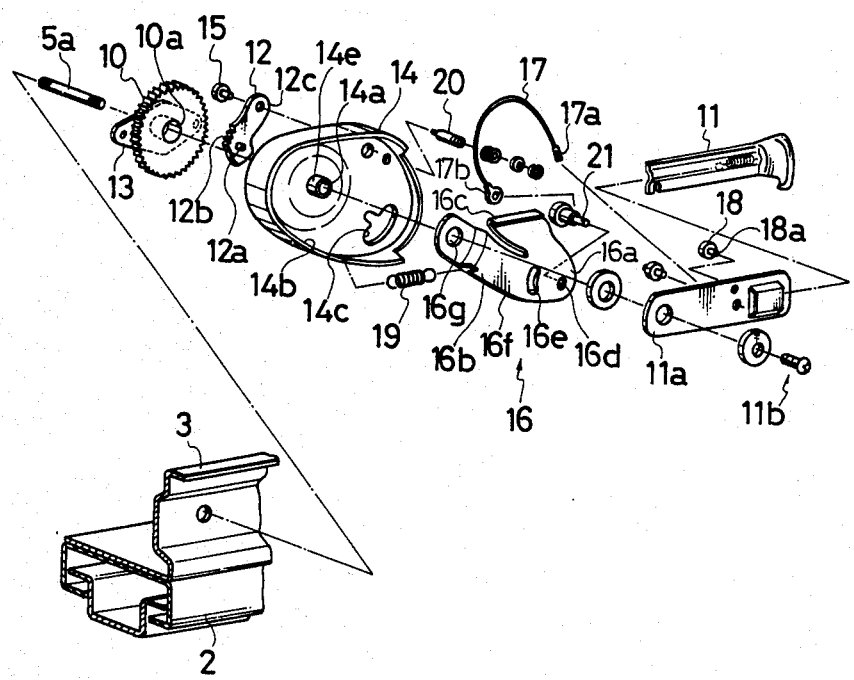
FIG. 3 is an exploded perspective view of a principal part of the first embodiment as in the FIG. 2.

On the outer surface of the lateral section of the seat frame (3), there is fixedly mounted the lock gear (10) by means of a fixing bracket (13) fixed to that surface of the seat frame (3), as best shown in FIG. 3. The housing (14) is provided above the outer side surface of the lock gear (10) such that it is at the hole (14a) thereof fixed to the extremity of the extension (5a) of the drive rod (5), with the operation lever (11), also, rotatably secured to such extremity of the drive rod extension (5a) by means of a fixing screw (11b). The stopper (12), which is of an arcuate shape, is rotatably, pivotally arranged on the housing (14) at the side of the lock gear (10) such that its upper end portion (12c) is rotatably pivoted by means of a pin (15) to the housing (14) and its toothed portion (12b) is normally in meshed engagement with the lock gear (10). More specifically, the stopper (12) comprises the upper end portion (12c), the toothed portion (12b) formed partially on the peripheral surface of the lower portion of the stopper (12) in mesh with the lock gear (10), and a projection (12a) formed at the lower end portion of the stopper (12) in a manner extending laterally thereof in a horizontal direction, the projection (12a) being slidably inserted through an elongated hole (14c) perforated in the housing (14).

Interiorly of the housing (14), there is rotatably mounted a deformed V-shaped plate member (16) which has first and second leg portions (16a)(16b) extending upwardly in a bifurcated fashion as illustrated, and comprises an outwardly projecting flange portion (16c) formed at the upper end of the first leg portion (16a), a lowermost end portion (16d), an arcuate guide hole (16e) perforated therein, and a hole (16g) perforated in the upper end part of the second leg portion (16b). Thus-constructed plate member (16) is at its hole (16g) rotatably secured around an annular protrusion (14e) formed in a sense circumscribing the hole (14a) of the housing (14), and further biased downwardly by means of a spring (19) which extends beteween the lower side portion (16f) of the plate member (16) and the outwardly projected peripheral flange portion (14b) of the housing (14), with such arrangement that the projection (12a) of the stopper (12) is slidably inserted through the arcuate guide hole (16e) of the plate member (16), whereby due to the plate member (16) being biased by the spring (19), the stopper (12) is also biased by the plate member (16) through the guide hole (16e) into engagement with the lock gear (1). It should be noted that the guide hole (16e) is disposed in alignment with the elongated hole (14c) of the housing (14), and the projection (12a) of the stopper (12) passes through those two holes (14c)(16e).

In this context, it is to be seen that the plate member (16) is rotatable about the hole (14a) of the housing (14) upwardly and downwardly, and in response to the upward or downward rotation of the plate member (16), the projection (12a) of the plate member (12) is guided along the arcuate guide hole (16e) and brought to contact with the upper or lower end of the hole (16e) in a direction away from the lock gear (10), with the result that the stopper (12) is released from its engagement with the lock gear (10), and the guide hole (16e), therefore, acts as a lock releasing hole.

The above-mentioned operation lever (11) is, thus, disposed laterally of the plate member (16) with its rotation center being identical to that of the latter, such that the plate member (16) is interposed between the housing (14) and the operation lever (11). Specifically, the lever (11) has a base end portion (11a) in which perforated is a hole (11a), and is rotatably supported by means of the fixing screw (11b), as stated before, which fixing screw (11b) passes through the hole (11a), thereby securing the lever (11) at the end of the extension (5a) of the drive rod (5) in rotatable manner. Further, the operation lever (11) is provided with a guide pin (18) having a head (18a). The head (18a) of the guide pin (18) is so arranged that it is to be abutted against the rear side of the outwardly extending flange portion (16c) of the plate member (16), when the lever (11) is raised.

There is arranged a connecting wire member (17) between the plate member (16) and the operation lever (11) in a substantially inverted-U-shaped form, such that the first end portion (17a) of the wire member (17) is secured to the operation lever (11) whereas the second end portion (17b) thereof is secured to the lowermost end portion (16d) of the plate member (16) by means of a fixing pin (21), and the midway portion (17c) thereof is hung on a support pin (20) fixed on the housing (14). Therefore, the wire member (17) serves to retain the plate member (16) in a normal position in this state, and it will be seen that the lowering of the lever (11) results in the drawing down of the first end portion (17a) of the wire member (17), which causes the pulling upwards of the second end portion (17b), to thereby cause the upward rotation of the plate member (16).

Now, with particular reference to FIGS. 4 to 6, the operation of the present invention will be discussed.

Figure 4:
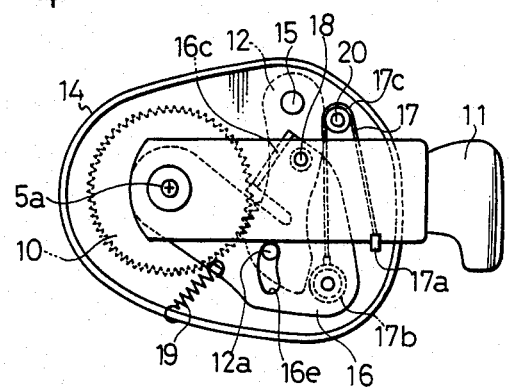
FIG. 4 is a side view of the same principal part as in the FIG. 3, showing the state where the height adjusting device is in a locked state.

Firstly, as shown in FIG. 4, in a normal state, the operation lever (11) is positioned substantially horizontally, with its guide pin (18) being disposed adjacent to the flange portion (16c) of the plate member (16), and by the biasing force of the spring (19), the plate member (16) is biased downwardly so that the projection (12a) of the stopper (12) is kept in contact with the upper end of the guide hole (16e), which advantageously maintains the engagement of the stopper (12) with the lock gear (10). As a result, the drive rod (5) is retained in a locked state and prevented against rotation, whereupon the seat cushion (1) is positively retained in a predetermined height level.

In this normal state, it should be understood that the plate member (16) is supported effectively against its movement since its flange portion (16c) is positioned adjacent to and ready to abut against the guide pin (18) which, therefore, limits the downward movement of the plate member (16), and further its lowermost end portion (16d) is held against its lowermost end portion (16d) is held against downward movement by the wire member (17). This means that the plate member (16) is maintained motionless at two points, namely, at the flange and lowermost end portions (16c)(16d), and the stopper (12) is thereby prevented against movement, thus keeping the locked state more positively.

Figure 5:
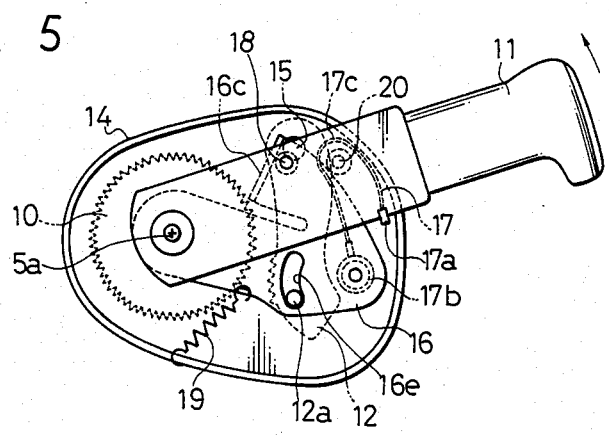
FIG. 5 is a side view of the same principal part, showing the state where an operation lever is raised to bring the height adjusting device to an unlocked stat.
Figure 6:
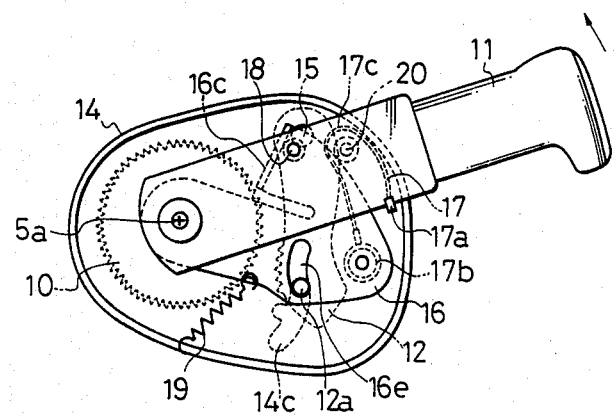
FIG. 6 is a side view of the same principal part, showing the state where the operation lever is further raised.

Next, referring to FIG. 5, when raising the operation lever (11) from the above-stated normal position for a higher seating height adjustment, the guide pin (18) is brought to contact with the flange portion (16c) of the plate member (16) and with further raising of the lever (11), the flange portion (16c) is pushed upwardly by the guide pin (18), causing the plate member (16) to rotate counterclockwise, as shown, against the downwardly biasing force of the spring (19). In response to such rotation of the plate member (16), the projection (12a) of the stopper (12) is displaced along the guide hole (16e) in a direction from the upper end of the hole (16e) down to the lower end thereof. With such downward displacement of the projection (12a), the toothed portion (12b) of the stopper (12) is brought in a direction away from the lock gear (10), whereby the stopper (12) is disengaged from the lock gear (10), thus releasing the height adjusting device from its locked state.

Figure 7:
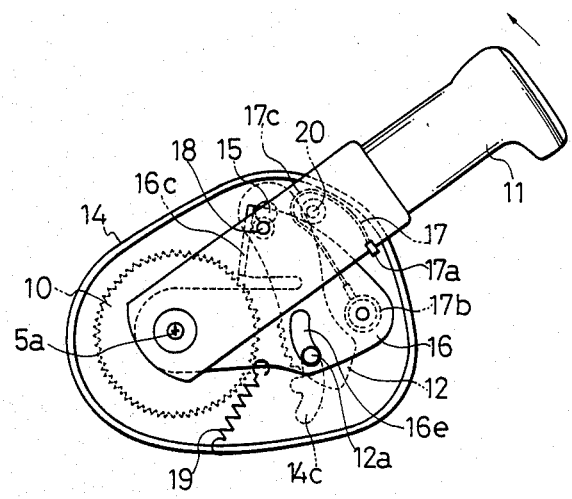
FIG. 7 is a side view of the same principal part, showing the state where the raising of the operation lever causes the rotation of a drive rod to actuate the height adjusting device for a higher seating position.

Then, when the operation lever (11) is still further raised, its guide pin (18) pushes the flange portion (16c) more upwardly to thereby rotate the plate member (16) further upwardly. As shown in FIG. 6, with such further rotation of the plate member (16), the projection (12a) of the stopper (12) resting at the lower end of the guide hole (16e) is displaced, as it stands, along the elongated hole (14c) of the housing (14) in an upward direction, and brought to contact with the upper end of the elongated hole (14c). With the lever (11) continuing to be raised, the elongated hole (14c) is then pushed upwardly by the projection (12a), thereby causing the housing (14) per se to rotate counterclockwise, as shown in FIG. 7, together with the operation lever (11). The rotation of the housing (14) causes the simultaneous rotation of the extension (5a) of the drive rod (5) and thus the rotation of the drive rod (5) per se to effect the raising of the seat frame (3) through the aforementioned gear and link mechanisms.

At this point, the spring (19) is pulled longer between the lower side portion (16f) of the plate member (16) and the peripheral flange portion (14c) of the housing (14), and the wire member (17) is loosened idle from the support pin (20).

After having rotated the operation lever (11) for a desired seating height, an operator or occupant on the seat who grips and rotates the lever (11) lets go of it, and consequently, by the contracting force of the spring (19), the plate member (16) is returned to and retained at its initial position shown in FIG. 4, while simultaneously the lever (11) is rotated down by the plate member (16) to its normal horizontal position and retained there by the wire member (17). Such returning actions, also simultaneously, cause the upward displacement of the projection (12a) of the stopper (12) along the guide hole (16e) to the upper end of the hole (16e), which in turn brings the toothed portion (12b) of the stopper (12) into engagement with the lock gear (10). Thus, the height adjusting device is in a locked state.

Figure 8:
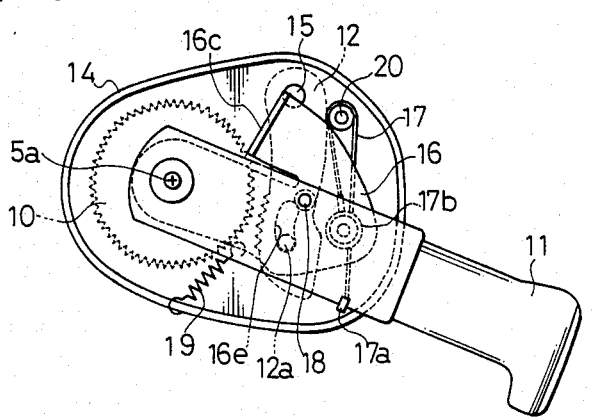
FIG. 8 is a side view of the same, showing the state where the operation lever is lowered to bring the height adjusting device to other unlocking state.
Figure 9:
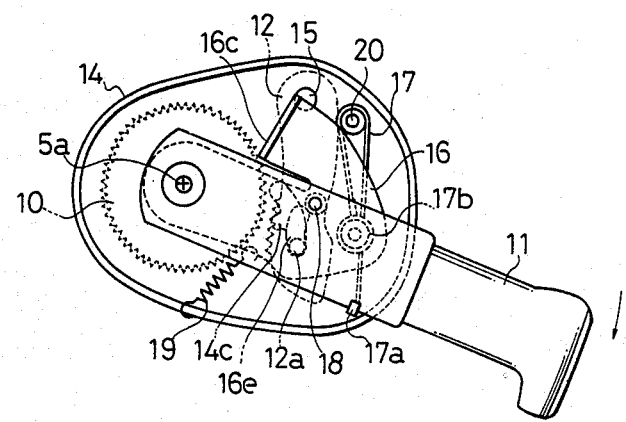
FIG. 9 is a side view which shows that the operation lever is further lowered.
Figure 10:
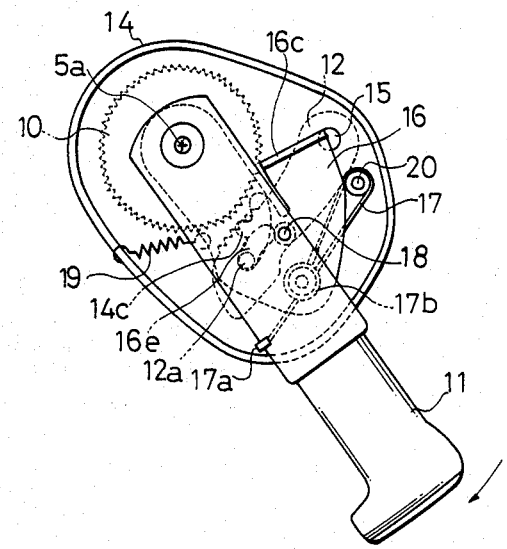
FIG. 10 is a side view which shows that the lowering of the operation lever causes the rotation of the drive rod to actuate the height adjusting device for a lower seating position.
Figure 11:
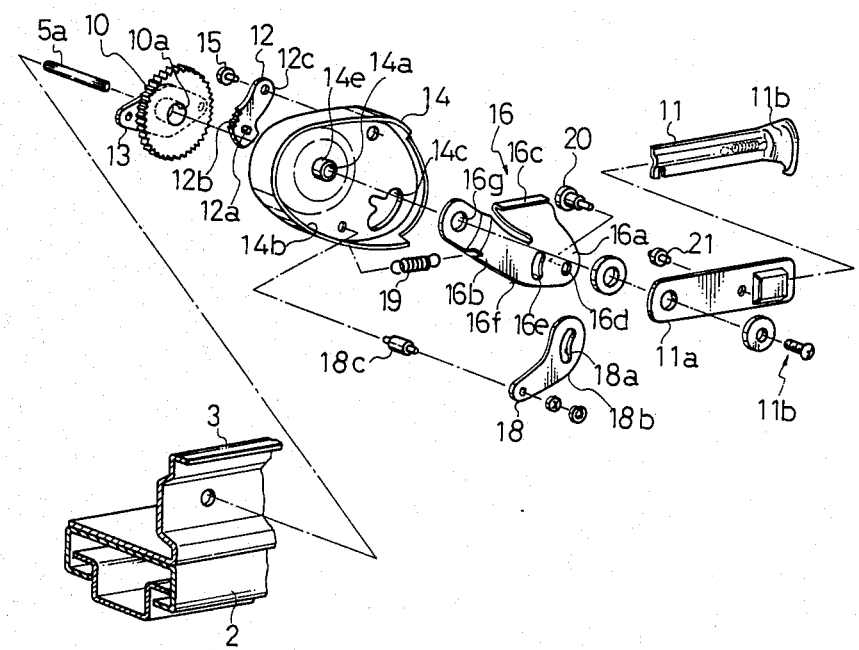
FIG. 11 is an exploded perspective view of a second embodiment of the present invention.

Now, referring to FIGS. 8 through 10, illustrated is the lowering operations of the height adjusting device.

As shown in FIG. 8, when rotating the operation lever (11) downwardly, the first end portion (17a) of the wire member (17) secured to the lever (11) is pulled down, which simultaneously causes the pulling upwardly of the second end portion (17b) of the wire member (17) to translate the wire member (17) per se in a direction of the first end portion (17a) side in relation to the support pin (20), and the plate member (16), to which the second portion (17b) is secured, is thereby to rotate counterclockwise against the downwardly biasing force of the spring (19). In response to such rotation of the plate member (16), the projection (12a) of the stopper (12) is displaced along the arcuate guide hole (16e) of the plate member (16) in a direction from the upper end of the hole (16e) down to the lower end thereof, with the result that the toothed portion (12b) of the stopper (12) is disengaged from the lock gear (10).

Then, as shown in FIG. 9, with further downward rotation of the lever (11), the second end portion (17b) of the wire member (17) is further pulled upwardly and the projection (12a) resting at the lower end of the guide hole (16e) is displaced, as it stands, along the elongated hole (14c) downwardly and brought to contact with the lower end of the elongated hole (14c).

With the lever (11) continuing to be rotated downwardly, as shown in FIG. 10, the housing (14) is rotated clockwise by the projection (12a) pushing the lower end of the elongated hole (14c) of the housing (14) in a downward direction. This rotation of the housing (14) causes the simultaneous rotation of the extension (5a) of the drive rod (5), whereby the seat frame (3) is lowered by the drive rod (5) through the aforementioned gear and link mechanisms.

After having rotated the operation lever (11) for a desired seating height, as described above, when the lever (11) is released from the hand of the occupant gripping it at this point, the plate member (16) is returned to its initial position by the contracting force of the spring (19), which simultaneously causes the downward movement of the second end portion (17b) of the wire member (17) to translate the wire member (17) per se in a direction of its second end portion (17b) side in relation to the support pin (20), and the operation lever (11) is thereby raised and returned to its normal horizontal position as shown in FIG. 4.

From the description above, it will be appreciated that the simply raising or lowering of the operation lever (11) produces a desired seating height adjustment and also the locking and unlocking operation thereof. Accordingly, the operation of the height adjustment of the seat is greatly improved in terms of simplicity and operational efficiency. Further, the locked state of the device in accordance with the present invention is positively maintained at the two points, that is to say, the flange portion (16c) of the plate member (16) and the second end portion (17b) of the wire member (17).

In the illustrated embodiment, the operation lever (11) is of a longitudinally slidable type, but may be designed in other form.

Reference is, now, made to FIGS. 11 through 18, which shows the second embodiment of the present invention. All like designations used therein correspond to like parts and members of the the above-described first embodiment of the invention.

In the present embodiment, all the constituent parts and components are the same with those of the first embodiment above, except for a release plate designated at (18) which is provided instead of the wire member (17). Therefore, a specific description will be made in regard to the release plate (18) and its associated peripheral parts as well as its actions hereinafter.

The release plate (18) is formed in an arcuate shape and has a dogleg-like guide hole (18a) perforated in its upper portion, the shape of the hole (18a) being formed reversely relative to that of the arcuate release plate (18). This release plate (18) is interposed between the plate member (16) and operation lever (11) in such a manner that it is rotatably supported at its lower end by a support pin (18c) fixed on the housing (14), its elbow portion (18b) is abutted on a lock pin (20) provided at the lowermost end portion (16d) of the plate member (16), and through its dogleg-like guide hole (18a), a guide pin (21) formed on the operation lever (11) is slidably inserted.

Figure 12:
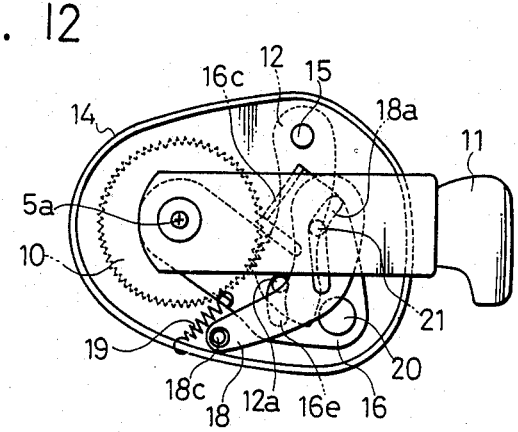
FIG. 12 is a side view of the same principal part as in the FIG. 11, showing that the height adjusting device is in a locked state.

As shown in FIG. 12, in a normal state, similarly to the above-described first embodiment, the stopper (12) is engaged with the lock gear (10) and the operation lever (11) is positioned horizontally, thus placing the height adjusting device in a locked state. In such state, the guide pin (21) of the lever (11) is positioned substantially at the middle of the dogleg-like guide hole (18a), and the projection (12a) of the stopper (12) is positioned at the upper end of the guide hole (16e) of the plate member (16). Accordingly, the stopper (12) is kept in a positive engagement with the lock gear (10) by both plate member (16) and release plate (18); in other words, the drive rod (5) is positively locked against rotation by the two points, namely, the guide pin (21) situated midway in the guide hole (18a) and the projection (12a) situated at the upper end of the arcuate guide hole (16e).

Figure 13:
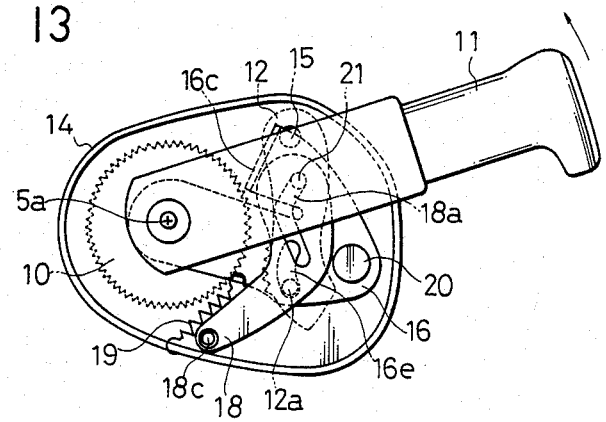
FIG. 13 is a side view which shows that the operation lever is raised for unlocking of the height adjuting device.

Next, referring to FIG. 13, when raising the operation lever (11) from the above-stated normal position for a higher seating height adjustment, the the guide pin (21) is moved upwardly along the dogleg-like guide hole (18a) to contact the upper end thereof, thereby causing the release plate (18) to rotate couterclockwise about the pin (18c) and bringing the upper end of the release plate (18) to contact with the flange portion (16c) of the plate member (16), with the projection (12a) of the stopper (12) being displaced along the guide hole (16e) of the plate member (16) in a direction from the upper end of the hole (16e) down to the lower end thereof. Such downward displacement of the projection (12a) brings the toothed portion (12b) of the stopper (12) in a direction away from the lock gear (10), whereupon the stopper (12) is disengaged from the lock gear (10), releasing the height adjusting device from its locked state.

Then, as shown in FIG. 14, with further raising of the lever (11), the projection (12a) of the stopper (12) resting at the lower end of the guide hole (6e) is then, as it stands, displaced along the elongated hole (14c) upwardly and brought to contact with the upper end of the hole (14c).

As shown in FIG. 15, as the lever (11) continues to be raised, the projection (12a) pushes upwardly the upper end of the guide hole (14c) and the housing (14) is thereby caused to rotate counterclockwise together with the lever (11), which simultaneously causes the rotation of the drive rod (5) via its extension (5a) to adjustably raise the seat frame (5).

After having rotated the operation lever (11) for a desired seating height, when the lever (11) is released from the hand of an occupant on the seat who grips it, similarly to the first embodiment above, the plate member (16) is returned to its initial position by means of the spring (19), the stopper (12) is engaged with the lock gear (10) and the operation lever is lowered and returned to its normal horizontal position as shown in FIG. 12 with the guide pin (21) on the lock gear (10) being moved down slidingly within the dogleg-like hole (18a) and returned to the middle point of the hole (18a).

Figure 16:
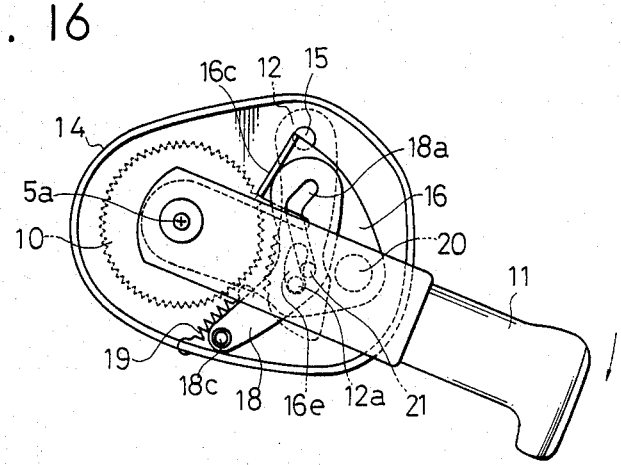
FIG. 16 is a side view showing the state where the operation lever is lowered.
Figure 17:
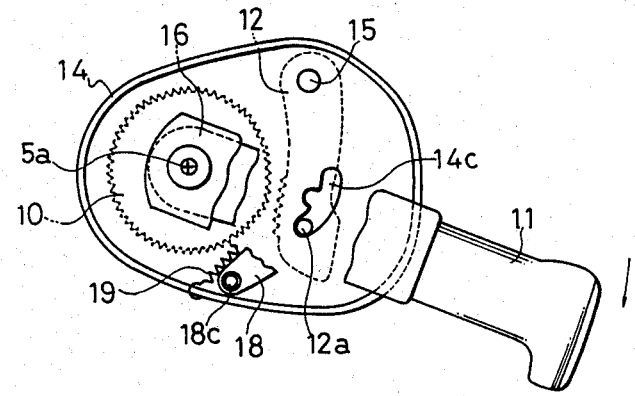
FIG. 17 is a partially broken side view in which the lever, a plate member, and a dogleg-like member are partially cut away, showing the state that the lever is further lowered.
Figure 18:
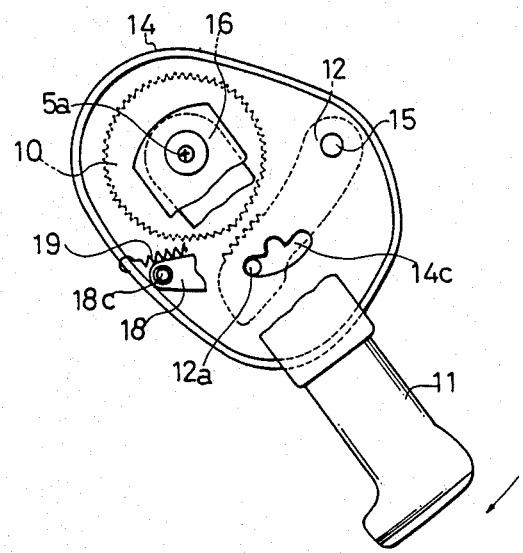
FIG. 18 is a partially broken side view of the same part as in the FIG. 17, showing that the lowering of the lever causes the rotation of the drive rod to actuate the device for a lower seating position.

FIGS. 16, 17 and 18 illustrate the lowering operation of the above-described height adjusting device. All the movements and interlocking actions of the constituent parts and members in this particular operation are the same with those in the previously described first embodiments, except that the deformed V-shaped plate member (16) is rotated in a direction to disengage the stopper (12) from the lock gear (10) by virtue of the release plate (18) being moved to push the flange portion (16c) of the plate member (16), in stead of the wire member (17). Description will therefore be given of the function of the release plate (18) only, as below.

Referring to FIG. 16, when the operation lever (11) is lowered, the guide pin (21) of the lever (11) is slidingly moved along the dogleg-like guide hole (18a) in the downward direction, while at the same time, the release plate (18) is rotated about the pin (18c) counterclockwise in a sense intersecting the lever (11) and brought to abutment with the flange portion (16c) of the plate member (16). It should be understood that, because of the lower half of the dog-like hole (18a) being inclined towards the flange portion (16c), the release plate (18) is moved in a direction towards the flange portion (16c) until the upper edge of the release plate (18) is abutted against the the same.

With further lowering of the lever (11), the plate member (16) is pushed by the release plate (18) and rotated together with the release plate (18) counterclockwise, so that the stopper (12) is disengaged from the lock gear (10) in the same way as described in the first embodiment above.

The subsequent movements of the lever (11) and rotation of the drive rod (5) for lowering of the seat frame (3) are also the same with those of the first embodiment, and description thereon is omitted, because the projection (12a) of the stopper (12) is only the subject for causing the rotation of the housing (14) to produce the lowering adjustment of the seat, which has been described before. FIGS. 17 and 18 show that the housing (14) is rotated downwardly by means of the projection (12a) during the lowering of the lever.

Then, when the lever (11) is released from the hand of an occupant on the seat, similarly to the first embodiment above, the plate member (16) is returned to its initial position by means of the spring (19), causing the engagement of the stopper (12) with the lock gear (10) by virtue of the upward displacement of the projection (12a) within the guide hole, as stated above, and simultaneously causing the release plate (18) to rotate clockwise as the flange protion (16c) thereof pushes down the upper edge of the release plate (18). This clockwise rotation of the release plate (18) causes the upward displacement of the guide pin (21) along the lower half of the dogleg-like hole (18a) to the middle point thereof, whereby the lever (11) is raised and returned to its normal horizontal position shown in FIG. 12.

In accordance with the above-discussed second embodiment of the present invention, it will be appreciated that the same advantageous effects as in the first embodiment can be attained; namely, the simply raising or lowering of the operation lever (11) provides both seat height adjustment and the locking/unlocking operation thereof, resulting in great improvement of the operationability in terms of simplicity and efficiency. Moreover. the locked state of the height adjusting device is maintained at the two points, namely, the guide pin (21) in the dogleg-like hole (18a) of the release plate (18) and the projection (12a) of the stopper (12), and therefore in a normal non-use state, the device is kept in a quite positive locked state, assuring a more safety against an unexpected unlocking of the device.

While the present invention has been described as above, it should be understood that the invention is not limited to the illustrated embodiments, but other replacements, modifications and additions may structurally be possible without departing from the spirit of the appended claims for the invention.

What is claimed is:

1. A height adjusting device for an automotive seat in which the seat is adjusted its height position in an upward and a downward directions by rotation of a drive rod, said height adjusting device comprising:
   an operation lever provided on said drive rod;
   a lock gear adjusted to be fixed to said seat; a movable member fixed to said drive rod;
   a stopper provided on said movable member, said stopper being normally engaged with said lock gear;
   a plate member rotatably provided within said movable member, said plate member being adapted to cause engagement and disengagement of said stopper with and from said lock gear and so arranged that when said operation lever is raised, said plate member is rotated in a direction to cause disengagement of said stopper from said lock gear; and
   a wire member operatively connected with said operation lever and said plate member in such a manner that when said operation lever is lowered, said wire member is moved so as to rotate said plate member in a direction to cause disengagement of said stopper from said lock gear.

2. The height adjusting device according to claim 1, wherein said operation lever is rotatably fixed to said drive rod, wherein said movable member comprises a housing, and wherein one end of said stopper is rotatably pivotally fixed to said housing.

3. The height adjusting device according to claim 1, wherein said operation lever has a guide pin provided thereon and said plate member has a flange portion formed thereon, and wherein said guide pin is disposed adjacent to said flange portion, and when said operation lever is raised, said guide pin is brought to abutment against said flange portion, whereby with raising of said operation lever, said plate member is rotated, causing the disengagement of said stopper from said lock gear.

4. The height adjusting device according to claim 1, wherein said stopper has a projection formed thereon and said plate member has an arcuate guide hole perforated therein, and wherein said projection is slidably inserted through said guide hole, so that with rotation of said plate member, said projection is displaced upwardly and downwardly along said guide hole, to thereby bring said stopper into engagement and disengagement with and from said lock gear.

5. The height adjusting device according to claim 1, wherein a biasing means is extended between a lower portion of said plate member and said movable member so as to bias said plate member in a direction to cause engagement of said stopper with said lock gear.

* * * * *